United States Patent Office 3,201,390
Patented Aug. 17, 1965

3,201,390
11α-RING - SUBSTITUTED - 11β - HYDROXYPREG-
NANE - 3,20 - DIONES AND PROCESS FOR THE
PRODUCTION THEREOF
Gunther S. Fonken, Charleston Township, Kalamazoo
County, Mich., assignor to The Upjohn Company, Kalamazoo, Mich., a corporation of Delaware
No Drawing. Filed June 6, 1962, Ser. No. 200,297
12 Claims. (Cl. 260—239.5)

The present invention relates to novel steroid compounds and is praticularly concerned with 11α-ring-substituted-11β-hydroxypregnane-3,20-diones, the 3,20-bis ketals thereof and a process for the production thereof.

The compounds and the process of the invention are illustratively represented in the following sequence of formulae:

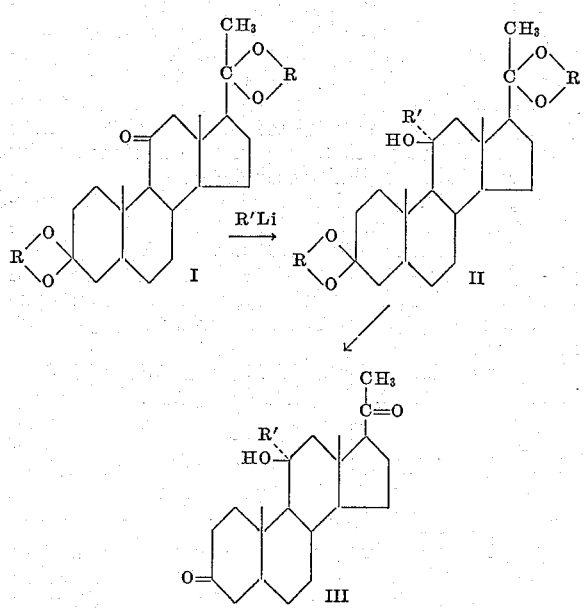

wherein R is an alkylene radical containing from two to eight carbon atoms, inclusive, and the attaching oxygen to carbon bonds are separated by a chain of at least two and not more than three carbon atoms and wherein R' is selected from the radicals consisting of

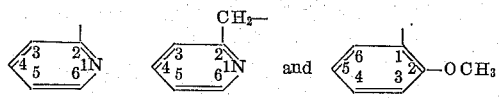

These radicals can be further substituted with lower alkyl and lower alkoxy in positions 3, 4, 5, or 6.

The same reaction can also be carried out with other pregnane compounds having non-interfering groups as well as with androstane-3,11,17-trione 3,17-bis ketal and etiocholane-3,11,17-trione 3,17-bis ketal.

The new compounds possess valuable pharamacological properties. Particularly, these compounds have vasodilatory, coronary dilatory, as well as sedative and sleep-potentiating and tranquilizing activity.

The new compounds can therefore be used in the treatment of hypertensive states as central nervous system depressants, heart mucle depressants and related conditions in valuable domestic animals.

The compounds of the present invention can be prepared and administered to mammals, birds, and animals, in a wide variety of oral and parenteral dosage forms, singly or in mixtures with other coacting compounds. They can be associated with a carrier, which can be a solid material or a liquid, in which the compound is dissolved, dispersed or suspended. The solid composition can take the form or tablets, powders, capsules or the like, preferably in unit dosage form for simple administration of precise dosages. The liquid composition can take the form of solutions, emulsions, suspensions, serums or elixirs.

According to the process of this invention, to the lithium Grignard reagent such as 2-pyridyllithium, α-picolyllithium, 2 - methoxyphenyllithium or, respectively, substituted 2-methoxyphenyllithium, α-picolyllithium or 2-pyridyllithium, dissolved in an organic solvent, inert to the reaction, such as ether, tetrahydrofuran, benzene and the like, is added 5β- (or 5α-) pregnane-3,11,20-trione 3,20-bis ketal or another selected 11-keto steroid, having no interfering groups or al interfering groups protected. The addition of the steroid is generally made at a temperature between −40 and 30° C., but higher or lower temperatures, not interfering with the solubility of the steroid and reactant, can be used. The time of reaction is usually between 6 and 96 hours, but shorter or longer periods are also operative. The amount of heat evolved in this reaction is rather small and cooling is therefore generally unnecessary. At the termination of the reactor, the solution is generally washed with water, dried and evaporated and the residue thus obtained is purified by standard methods, such as extraction, recrystallization and chromatography.

The ketal groups of the thus-obtained 11α-substituted steroid are removed by methods well known in the art such as acid hydrolysis, with dilute surfuric or hydrochloric acid, in an organic solvent such as menthanol, ethanol and the like.

The main steroid starting material, 5β-pregnane-3,11,20-trione-3,20-bis (ethylene ketal) was prepared as shown in U.S. Patent 2,897,198, which is the method employed by Oliveto et al. [J.A.C.S., 75, 486, (1953)].

In the same manner, the 5α-pregnane-3,11,20-trione 3,20-bis (ethylene ketal) has been prepared by reacting allopregnane-3,11,20-trione with ethylene glycol in the presence of p-toluenesulfonic acid monodydrate in toulene solution.

In the same manner, androstane-3,11,17-trione 3,17-bis (ethylene ketal) is produced by heating the androstane-3,11,17-trione in benzene or toluene solution with ethylene glycol in the presence of toluenesulfonic acid.

In the same manner, other alkylene ketals of the above-mentioned steroid can be prepared by reacting a selected steroid with propylene glycol, 1,2, 2,3, or 1,3-butylene glycols up to glycols having 8 carbon atoms and having the hydroxyl groups on vicinal carbon atoms or on carbon atoms removed from each other by not more than one $CH_2$ group.

The lithium Grignard reagents are prepared just before use in the manner shown in the examples.

Example 1

11α-(2-pyridyl)-11β-hydroxy-5β-pregnane-3,20-
dione 3,20-bis (ethylene ketal)

2-pyridyllithium was prepared by adding 40.5 g. (256 millimoles) of 2-bromopyridine dropwise, with stirring, to 200 ml. of 1.3 M butyllithium in ether, cooled to −40° C. in a nitrogen atmosphere.

To the resultant brown solution was added rapidly a solution of 20.9 g. (50 millimoles) of 5β-pregnane-3,11, 20-trione 3,20-bis (ethylene ketal), dissolved in 150 ml.

of benzene and 250 ml. of ether. The mixture was allowed to stand at room temperature for 3 days and was then washed four times with water and evaporated to dryness. Trituration of the resultant thick red-brown oil (containing some crystals) with 250 ml. of cold methanol gave 5.28 g. of white crystals of 11α-(2-pyridyl)-11β-hydroxy-5β-pregnane-3,20-dione 3,20-bis (ethylene ketal) of melting point 219 to 223° C. The methanol filtrate resulting from the trituration was evaporated to dryness and the material crystallized from 250 ml. of Skellysolve B to give another portion of 0.538 g. of 11α-hydroxy-(2-pyridyl)-11β-hydroxy-5β-pregnane-3,20-dione bis (ethylene ketal) of melting point 222 to 228° C. The mother liquor remaining from the Skellysolve B recrystallization gave by chromatography another portion of the desired 11-substituted diketal (0.90 g.) as well as 2.95 g. of unreacted starting material.

EXAMPLE 2

*11α-(2-pyridyl)-11β-hydroxy-5β-pregnane-3,20-dione*

2-pyridyllithium was prepared as described above, using 10.3 g. of 2-bromopyridine and 50 ml. of 1.3 M butyllithium in ether. To the 2-pyridyllithium, thus obtained, was added 4.80 g. of 5β-pregnane-3,11,20-trione 3,20-bis (ethylene ketal) in 30 ml. of benzene and 50 ml. of ether. The crude reaction mixture was diluted with water and the organic phase extracted with 3 N hydrochloric acid. The aqueous phase was repeatedly extracted with benzene, and the benzene solutions combined, washed with water, dried over anhydrous sodium sulfate and evaporated to dryness. Trituration of the residue with 55 ml. of methanol gave nearly colorless crystals of melting point 222 to 229° C., which were recrystallized from methanol to give two crops of 11α-(2-pyridyl)-11β-hydroxy-5β-pregnane-3,20-dione as follows: 0.24 g. of melting point 230 to 233° C. and a second crop of 0.31 g. of melting point 222 to 228° C.

A sample of this material was recrystallized for analysis from acetone to give pure 11α-(2-pyridyl)-11β-hydroxy-5β-pregnane-3,20-dione of melting point 232 to 234° C., $\lambda_{max.}^{EtOH}$ 263 m$\mu$, $a_M$ 3875

In the same manner as given in Example 1, allopregnane-3,11,20-trione 3,20-ethylene ketal, prepared by reacting allopregnane-3,11,20-trione with glycols in the presence of p-toluenesulfonic acid monohydrate, was added to a prepared solution of 2-pyridyllithium to give the corresponding 11α-(2-pyridyl)-11β-hydroxy-5α-pregnane-3,20-dione 3,20-bis (ethylene ketal).

By hydrolyzing 2 g. of this material in a mixture of 100 ml. of methanol and 10 ml. of 3 N sulfuric acid at room temperature overnight (approximately 16 hours), there was obtained 11α-(2-pyridyl)-11β-hydroxy-5α-pregnane-3,20-dione.

Instead of using bis (ethylene ketals) of pregnane-3,11,20-trione or allopregnane-3,11,20-trione, propylene ketal, 1,2 and 1,3-butylene ketals; 1,2, 1,3, 2,3-pentylene ketals; 1,2, 2,3, 3,4, 1,3 and 2,4- as well as other octylene ketals of the desired steroid can be used as starting material in the reaction described in Examples 1 and 2.

EXAMPLE 3

*11α-(2-pyridylmethyl)-11β-hydroxy-5β-pregnane-3,20-dione 3,20-bis (ethylene ketal)*

A solution was prepared of α-picolyllithium using 6.9 g. of lithium wire, in the procedure shown in Org. Syn. 23, 83 (1943). To this solution was added rapidly a solution of 20.9 g. (50 millimoles) of 5β-pregnane-3,11,20-trione 3,20-bis (ethylene ketal), dissolved in 100 ml. of benzene and 100 ml. of ether. During the addition a very small amount of heat was evolved. After the mixture had stood at room temperature (22 to 26° C.) during a period of three days, it was washed (cautiously) four times with water, filtered through sodium sulfate and concentrated at reduced pressure to a thick oil which was chromatographed over Florisil, taking fractions of 1.5 l. as follows:

TABLE I

| Fraction: | Solvent |
| --- | --- |
| 1 | Skellysolve B. |
| 2 | 2% acetone-Skellysolve B hexanes. |
| 3 | 5% acetone-Skellysolve B hexanes. |
| 4 | 10% acetone-Skellysolve B hexanes. |
| 5 | 25% acetone-Skellysolve B hexanes. |
| 6 | Acetone. |

Fraction 5 was evaporated and the residue recrystallized from methanol to give 13.44 g. of crude 11α-(2-pyridylmethyl) - 11β - hydroxy-5β-pregnane-3,20-dione 3,20-bis (ethylene ketal) of melting point 148 to 152° C. A further recrystallization of a sample from methanol gave pure 11α-(2-pyridylmethyl)-11β-hydroxy - 5β - pregnane - 3,20-dione 3,20-bis (ethylene ketal) of melting point 154 to 156° C., rotation [α]$_D$ —58° (in acetone);

$\lambda_{max.}^{EtOH}$ 264 m$\mu$; $a_M$ 3775

EXAMPLE 4

*11α-(2-pyridylmethyl)-11β-hydroxy-5β-pregnane-3,20-dione*

A solution of 5 g. of 11α-(2-pyridylmethyl)-11β-hydroxy-5β-pregnane-3,20-dione bis (ethylene ketal) in 500 ml. of methanol was stirred overnight at room temperature with 100 ml. of N hydrochloric acid. The mixture was concentrated to 100 ml. of volume in vacuo and thereupon 200 ml. of aqueous 4% sodium bicarbonate solution was added. The precipitated product was recovered by filtration. Recrystallization from aqueous methanol gave 2.68 g. of 11α-(2-pyridylmethyl)-11β-hydroxy-5β-pregnane-3,20-dione of melting point 167 to 172° C. Recrystallization of this material gave pure 11α-(2-pyridylmethyl)-11β-hydroxy-5β-pregnane-3,20-dione of melting point of 170 to 173° C. after two recrystallizations from aqueous methanol. Rotation of this material was [α]$_D$ —10° in acetone.

*Analysis.*—Calcd. for $C_{27}H_{37}NO_3$: C, 76.56; H, 8.81; N, 3.31. Found: C, 76.37; H, 9.06; N, 3.39.

EXAMPLE 5

*11α-(2-pyridylmethyl)-11β-hydroxy-5α-pregnane-2,30-dione 3,20-bis (ethylene ketal)*

5α-pregnane-3,11,20-trione 3,20-bis (ethylene ketal) was reacted as in Example 3 with α-picolyllithium. The mixture was allowed to stand for 42 hours, was thereupon washed with water and the organic layer filtered through sodium sulafte and concentrated at reduced pressure. The material was two times extracted with 10% acetone-Skellysolve B solution and the extract discarded. The remainder was recrystallized three times from methanol to give 11α-(2-pyridylmethyl)-11β-hydroxy-5α-pregnane-3,20-dione 3,20-bis (ethylene ketal).

EXAMPLE 6

*11α-(2-pyridylmethyl)-11β-hydroxy-5α-pregnane-3,20-dione*

A solution of 2 g. of 11α-(2-pyridylmethyl)-11β-hydroxy-5α-pregnane-3,20-dione 3,20-bis (ethylene ketal) in 200 ml. of methanol was stirred for a period of 18 hours at room temperature with 50 ml. of N hydrochloric acid. The mixture was concentrated to a volume of 40 ml. in vacuo. After the product was recovered by filtration it was recrystallized from aqueous methanol to give pure crystalline 11α-(2-pyridylmethyl)-11β-hydroxy-5α-pregnane-3,20-dione.

In the same manner other alkylene ketals such as the propylene ketal, the 1,2 2,3, 1,3-butylene ketal; the 1,2, 1,3, 2,3-pentylene ketal; 1,2, 2,3, 3,4, 1,3 and 2,4-hexylene ketal; 2,4, 3,5, 1,3, 1,2-heptylene ketal, and octylene ketals in which the ether oxygens are situated on vicinal carbons or carbons separated from each other by not more than one methylene group, of 5β-pregnane-3,11,20- trione and 5α-pregnane-3,11,20-trione (allopregnane-3,11,20-trione) can be used in the reactions, shown in Examples 3 through 6.

EXAMPLE 7

*11α-(2-methoxyphenyl)-11β-hydroxy-5β-pregnane-3,20-dione 3,20-bis (ethylene ketal)*

60 g. of 1-bromo-2-methoxybenzene and 200 ml. of an approximately 1,2 molar solution of 2-butyllithium (prepared by the procedure of Organic Reactions VIII, 285) were reacted to prepare a solution of 2-methoxyphenyllithium [by the procedure of Gilman, Toole and Spatz, J.A.C.S. 68, 2017 (1946)]. To this 2-methoxyphenyllithium solution, at 5° C., there was added, over the course of 1 hour, a solution of 20.9 g. of 5β-pregnane-3,11,20-trione 3,20-bis (ethylene ketal) in 50 ml. of benzene and 150 ml. of ether. The mixture was then stirred while allowing it to come to room temperature, and was worked up the following day by washing the organic solution several times with water, filtering through anhydrous sodium sulfate and evaporating to dryness. The crude extract was dissolved in Skellysolve B hexanes and chromatographed over Florisil using a column of 9 x 40 cm. and taking 1 l. eluate fractions as follows in Table II:

TABLE II

| Fraction: | Eluting solvent |
|---|---|
| 1 | Skellysolve B hexanes. |
| 2 | Skellysolve B hexanes. |
| 3 | 2% acetone-Skellysolve B hexanes. |
| 4 | 2% acetone-Skellysolve B hexanes. |
| 5 | 5% acetone-Skellysolve B hexanes. |
| 6 | 5% acetone-Skellysolve B hexanes. |
| 7 | 10% acetone-Skellysolve B hexanes. |
| 8 | 10% acetone-Skellysolve B hexanes. |
| 9 | 10% acetone-Skellysolve B hexanes. |
| 10 | 10% acetone-Skellysolve B hexanes. |
| 11 | 25% acetone-Skellysolve B hexanes. |
| 12 | 25% acetone-Skellysolve B hexanes. |
| 13 | Acetone. |
| 14 | Acetone. |

Fraction 8, a residue of 14.290 g., was recrystallized from Skellysolve B hexanes to give 4.46 g. of the starting material, 5β-pregnane-3,11,20-trione 3,20-bis (ethylene ketal) of melting point 125 to 142° C. The mother liquor from this crystallization was evaporated and the residue recrystallized from Skellysolve B to give 6.30 g. of a mixture of the starting material and 11α-(methoxyphenyl)-11β-hydroxy-5β-pregnane-3,20-dione bis (ethylene ketal). This mixture, on recrystallization from Skellysolve B hexanes, gave 1.51 g. of 11α-(2-methoxyphenyl)-11β-hydroxy-5β-pregnane-3,20-dione bis (ethylene ketal) of melting point 195 to 205° C.

Another portion of 11α-(2-methoxyphenyl)-11β-hydroxy-5β-pregnane-3,20-dione 3,20-bis (ethylene ketal) was obtained from fraction 7 by separating, mechanically, crystals of the starting material from the desired product.

A portion of the thus-obtained material was recrystallized from acetone-Skellysolve B to give 11α-(2-methoxyphenyl)-11β-hydroxy-5β-pregnane-3,20-dione 3,20-bis (ethylene ketal) of melting point 203 to 206° C. and rotation [α]$_D$ +84° in acetone;

$\lambda_{max.}^{EtOH}$ 219 mμ; $a_M$ 7225

*Analysis.*—Calcd. for $C_{32}H_{46}O_6$: C, 72.97; H, 8.80. Found: C, 72.66; H, 9.40.

EXAMPLE 8

*11α-(2-methoxyphenyl)-11β-hydroxy-5β-pregnane-3,20-dione*

1.02 g. of crude 11α-(2-methoxyphenyl)-11β-hydroxy-5β-pregnane-3,20-dione 3,20-bis (ethylene ketal) of melting point 195 to 205° C. was dissolved in 200 ml. of methanol by heating. The solution was thereupon cooled to room temperature and treated with 25 ml. of N-hydrochloric acid for a period of 18 hours. Partial evaporation in vacuo followed by dilution with water gave 0.91 g. of silky matted needles of melting point 191 to 201° C., which upon recrystallization from acetone-Skellysolve B hexanes gave 0.76 g. of 11α-(2-methoxyphenyl)-11β-hydroxy-5β-pregnane-3,20-dione of melting point 197 to 203° C. and rotation [α]$_D$ +135° in acetone;

$\lambda_{max.}^{EtOH}$ 271 mμ; $a_M$ 1980

*Analysis.*—Calcd. for $C_{28}H_{38}O_4$: C, 76.67; H, 8.73. Found: C, 76.24; H, 8.73.

EXAMPLE 9

*11α-(2-methoxyphenyl)-11β-hydroxy-5α-pregnane-3,20-dione 3,20-bis (ethylene ketal)*

In the same manner given in Example 7, allopregnane-3,11,20-trione 3,20-bis (ethylene ketal) was reacted with 2-methoxyphenyllithium to give 11α-(2-methoxyphenyl)-11β-hydroxy-5α-pregnane-3,20-dione 3,20-bis (ethylene ketal).

EXAMPLE 10

*11α-(2-methoxyphenyl)-11β-hydroxy-5α-pregnane-3,20-dione*

In the same manner given in Example 8, 11α-(2-methoxyphenyl) - 11β - hydroxy - 5α - pregnane - 3,20-dione 3,20-bis (ethylene ketal) was hydrolyzed in a mixture of methanol containing hydrochloric acid to give 11α - (2 - methoxyphenyl) - 11β - hydroxy - 5α - pregnane-3,20-dione.

In the same manner shown in Examples 7 through 10, other alkylene ketals as defined before of 5β-pregnane-3,11,20-trione or 5α-pregnane-3,11,20-trione (allopregnane-3,11,20-trione) can be used in the before-shown examples to produce the corresponding 11α-substituted 2-methoxyphenyl-11β-hydroxy steroids.

In the same manner other alkyl- and alkoxy-substituted 11-pyridyl, picolyl, and 2-methoxyphenyl steroids can be prepared by using selected alkyl- and alkoxy-substituted pyridyllithium, alkyl-substituted picolyllithium and alkyl-substituted 2-methoxyphenyllithium on 3,20-bis ketals of 5α-pregnane-3,11,20-trione, 5β-pregnane-3,11,20 - trione, or 3,17-bis ketals of androstane-3,11,17-trione or etiocholane-3,11,17-trione.

I claim:

1. A compound of the formula

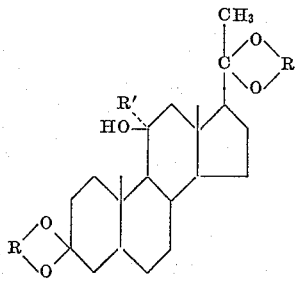

wherein R is an alkylene radical containing from two to eight carbon atoms, inclusive, and the attaching oxygen to carbon bonds are separated by a chain of at least two and not more than three carbon atoms and wherein R' is wherein R' is selected from the group consisting of

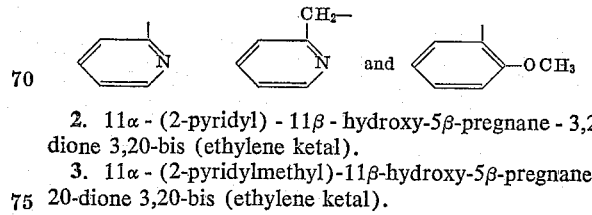

2. 11α - (2-pyridyl) - 11β - hydroxy-5β-pregnane - 3,20-dione 3,20-bis (ethylene ketal).

3. 11α - (2-pyridylmethyl)-11β-hydroxy-5β-pregnane-3,20-dione 3,20-bis (ethylene ketal).

4. 11α-(2-methoxyphenyl)-11β-hydroxy-5β-pregnane-3,20-dione 3,20-bis (ethylene ketal).

5. A compound of the formula

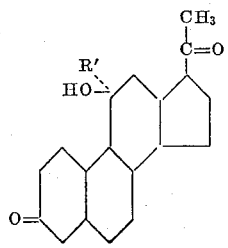

wherein R' is selected from the group consisting of

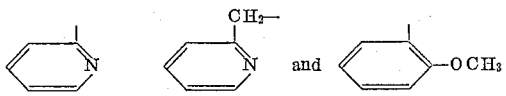

6. 11α - (2 - pyridyl)-11β-hydroxy - 5β - pregnane-3,20-dione.

7. 11α - (2-pyridylmethyl)-11β-hydroxy-5β-pregnene-3,20-dione.

20-dione.

8. 11α-(2-methoxyphenyl)-11β-hydroxy-5β-pregnane-3,20-dione.

9. A process for the production of a steriod compound of the formula

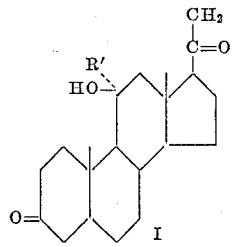

wherein R' is selected from the group consisting of

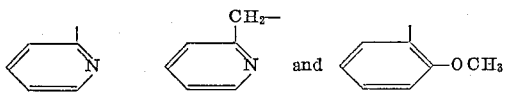

which comprises treating a steroid compound of the formula:

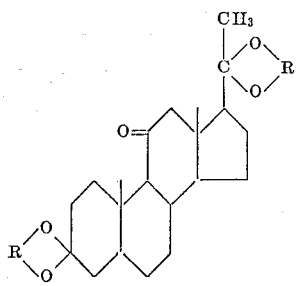

wherein R is an alkylene radical containing from two to eight carbon atoms, inclusive, and the attaching carbon bonds are separated by a chain of at least two and not more than three carbon atoms, with a lithium compound selected from the group consisting of

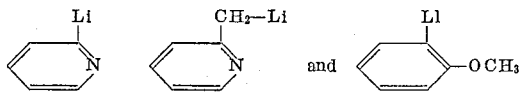

and hydrolyzing the thus-obtained bis ketal to obtain a compound of Formula I.

10. The process according to claim 9 for the production of 11α - (2-pyridyl)-11β - hydroxy-5β-pregnane-3,20-dione, in which the starting compound is 5β-pregnane-3,11,20-trione 3,20-bis (ethylene ketal) and the lithium compound is 2-pyridyllithium.

11. The process according to claim 9 for the production of 11α-(2-pyridylmethyl)-11β-hydroxy-5β-pregnane-3,20-dione, in which the starting compound is 5-β-pregnane-3,11,20-trione 3,20-bis (ethylene ketal) and the lithium compound is α-picolyllithium.

12. The process according to claim 9 for the production of 11α(2-methoxyphenyl)-11β-hydroxy-5β-pregnane-3,20-dione, in which the starting compound is 5β-pregnane-3,11,20-trione 3,20-bis (ethylene ketal) and the lithium compounds is 2-methoxyphenyllithium.

No references cited.

LEWIS GOTTS, *Primary Examiner.*

UNITED STATES PATENT OFFICE
CERTIFICATE OF CORRECTION

Patent No. 3,201,390                                          August 17, 1965

Gunther S. Fonken

It is hereby certified that error appears in the above numbered patent requiring correction and that the said Letters Patent should read as corrected below.

Column 1, line 66, for "mucle" read -- muscle --; column 2, line 6, for "or", first occurrence, read -- of --; line 19, for "al" read -- all --; line 28, for "reactor" read -- reaction --; line 34, for "surfuric" read -- sulfuric --; line 44, for "monodydrate" read -- monohydrate --; same column 2, line 45, for "toulene" read -- toluene --; column 4, line 37, strike out "of"; line 43, for "-2,30-", in italics, read -- -3,20- --, in italics; line 49, for "sulafte" read -- sulfate --; column 5, line 9, for "1,2" read -- 1.2 --; column 6, line 66, strike out "wherein R′ is"; column 7, line 25, strike out "20-dione."; line 26, after "-3," insert -- 20-dione. --; column 8, line 41, for "compounds" read -- compound --.

Signed and sealed this 26th day of April 1966.

(SEAL)
Attest:

ERNEST W. SWIDER
Attesting Officer

EDWARD J. BRENNER
Commissioner of Patents